United States Patent
Mertens et al.

(10) Patent No.: US 11,167,640 B2
(45) Date of Patent: Nov. 9, 2021

(54) MOTOR VEHICLE HAVING A DISPLAY APPARATUS WITH TWO INTEGRALLY FORMED SUBREGIONS ARRANGED AT AN ANGLE TO ONE ANOTHER

(71) Applicant: AUDI AG, Ingolstadt (DE)

(72) Inventors: Joris Mertens, Ingolstadt (DE); Jacques Hélot, Ingolstadt (DE); Immo Redeker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/650,055

(22) PCT Filed: May 10, 2019

(86) PCT No.: PCT/EP2019/062061
§ 371 (c)(1),
(2) Date: Mar. 24, 2020

(87) PCT Pub. No.: WO2019/219534
PCT Pub. Date: Nov. 21, 2019

(65) Prior Publication Data
US 2020/0398668 A1     Dec. 24, 2020

(30) Foreign Application Priority Data

May 18, 2018 (DE) .......................... 102018207932.5

(51) Int. Cl.
*B60K 37/02* (2006.01)
*G02B 27/01* (2006.01)

(52) U.S. Cl.
CPC .......... *B60K 37/02* (2013.01); *G02B 27/0103* (2013.01); *G02B 27/0179* (2013.01);
(Continued)

(58) Field of Classification Search
CPC ............ B60K 37/02; B60K 2370/1529; B60K 2370/334; B60K 35/00; B60K 37/06;
(Continued)

(56) References Cited

U.S. PATENT DOCUMENTS

| 2014/0005886 A1* | 1/2014 | Morris ................... G02B 27/01 701/36 |
| 2017/0176744 A1* | 6/2017 | El-Ghoroury ............ G02B 5/10 |
| 2019/0241071 A1* | 8/2019 | Trabucco ................ E05F 15/60 |

FOREIGN PATENT DOCUMENTS

| CN | 102822723 A | 12/2012 |
| CN | 107850989 A | 3/2018 |

(Continued)

OTHER PUBLICATIONS

International Search Report for PCT/EP2019/062061 dated Jul. 31, 2019.
(Continued)

*Primary Examiner* — Yaron Cohen
(74) *Attorney, Agent, or Firm* — Staas & Halsey, LLP

(57) ABSTRACT

At least one piece of information is displayed by a display apparatus in a motor vehicle. The display apparatus has a first subregion in the form of a viewing window of the motor vehicle, where the viewing window is part of the boundary of an interior of the motor vehicle. A second display subregion, designed to display the information, is formed integrally with the first subregion, such that the first subregion and the second display subregion lead into one another at an angle. At least regions of the second display subregion are designed so as to project into the interior of the motor vehicle.

20 Claims, 1 Drawing Sheet

(52) U.S. Cl.
CPC .................. *B60K 2370/1529* (2019.05); *B60K 2370/334* (2019.05); *G02B 2027/0105* (2013.01); *G02B 2027/0187* (2013.01)

(58) Field of Classification Search
CPC ........ B60K 2370/1438; B60K 2370/23; B60K 2370/736; B60K 2370/785; B60K 2370/177; B60K 2370/21; B60K 2370/149; G02B 27/0103; G02B 27/0179; G02B 2027/0105; G02B 2027/0187; B60J 1/008
See application file for complete search history.

(56) References Cited

FOREIGN PATENT DOCUMENTS

| DE | 10039131 | A1 | 4/2001 |
|---|---|---|---|
| DE | 102007057725 | A1 | 6/2008 |
| DE | 102010013241 | A1 | 9/2011 |
| DE | 102010056411 | A1 | 6/2012 |
| DE | 102011121617 | A1 | 6/2013 |
| DE | 102012005853 | A1 | 9/2013 |
| DE | 102012208565 | A1 | 11/2013 |
| DE | 102016220245 | A1 | 4/2018 |
| JP | 60-4414 | A | 1/1985 |
| KR | 10-2013-0071239 | | 6/2013 |
| WO | 87/03846 | | 7/1987 |
| WO | 2017/020166 | A1 | 2/2017 |
| WO | 2018/010969 | A1 | 1/2018 |

OTHER PUBLICATIONS

German Office Action for DE 102018207932.3 dated Dec. 10, 2018.
PCT/EP2019/062061, May 10, 2019, Joris Mertens et al., Audi AG.
DE102018207932.3, May 18, 2018, Joris Mertens et al., Audi AG.
English Translation dated Dec. 3, 2020 of International Preliminary Report on Patentability, dated Nov. 24, 2020, for International Application No. PCT/EP2019/062061, 7 pp.
Chinese Office Action dated Jan. 26, 2021 for Chinese Patent Application No. 201980005095.7, 6 pages.

* cited by examiner

MOTOR VEHICLE HAVING A DISPLAY APPARATUS WITH TWO INTEGRALLY FORMED SUBREGIONS ARRANGED AT AN ANGLE TO ONE ANOTHER

CROSS REFERENCE TO RELATED APPLICATIONS

This application is the U.S. national stage of International Application No. PCT/EP2019/062061, filed May 10, 2019 and claims the benefit thereof. The International Application claims the benefit of German Application No. 102018207932.3 filed on May 18, 2018, both applications are incorporated by reference herein in their entirety.

BACKGROUND

Described below is a motor vehicle having a display apparatus for displaying at least one piece of information, wherein the display apparatus has a first subregion, which is in the form of a viewing window of the motor vehicle and at least regions of which bound an interior of the motor vehicle, and a second display subregion, designed to display the information.

It is known that control panels today have a multiplicity of control elements, wherein in particular passive bezels separate the control areas from one another and do not also contribute to control. In particular, these bezels are then embodied in passive form and separately from for example a front window of the motor vehicle. As a result, no visual connecting or linking to the corresponding windows of the motor vehicle takes place. The covers or the bezels serve merely to visually separate the individual control elements.

DE 100 39 131 A1 discloses a motor vehicle having a window in the form of a screen. All or at least one window/windows, e.g., the windshield, are provided as a screen, for example with LCD displays for one or more computers that are in the vehicle, or a hologram can be projected in the regions of the windows.

Furthermore DE 10 2010 056 411 A1 discloses a display apparatus for a motor vehicle having a first and a second display unit. To present convenience information, in particular information relating to driver assistance systems, the first display unit is arranged in the form of an elongate, graphics-compatible color display in the surroundings of the window root of the front window, and the second display unit is a further display arranged in the vehicle, in particular in the central console of the vehicle.

In addition, DE 10 2011 121 617 A1 discloses a method for displaying information in a vehicle interior by a display apparatus of a motor vehicle. To display the information, at least one horizontal lower region of the display apparatus extending in at least one horizontal direction, which region is of smaller physical extent than the display apparatus, is determined on the display apparatus by a control stipulation from the user, the position of the region on the display device at least along the horizontal direction being prescribed by the user by the control stipulation. The at least one lower region is selectively actuated for the display information.

A disadvantage of the related art is that in particular passive assemblies of the display apparatuses waste possible user surfaces. No active and physical interaction therefore takes place between the control unit and the display fully. In particular, the user interfaces are surfaces in the primary viewing area of an occupant of the motor vehicle that remain unused.

SUMMARY

The display apparatus described herein provides improved use of installation space in a motor vehicle.

One aspect relates to a motor vehicle having a display apparatus for displaying at least one piece of information. The display apparatus has a first subregion, which is in the form of a viewing window of the motor vehicle and at least regions of which bound an interior of the motor vehicle, and a second display subregion, designed to display the information.

The information to be displayed can be generated by an electronic, visual display unit of the motor vehicle.

There is provision for the first subregion and the second display subregion to be in integral form, wherein the subregions lead into one another at an angle, in particular when viewed in cross section or longitudinal section, and at least regions of the second display subregion are designed to project into the interior of the motor vehicle.

A lead-in point between the first subregion and the second display subregion can be rounded, so that, when viewed in cross section through the subregions, an outside of this lead-in point of the integral assembly is in a form without corners. An angle between the subregions is then measured by tangents to the regions, which may also be curved.

The first subregion can also be in the form of a display subregion for displaying information, for example by a head up display.

This allows in particular the second display subregion projecting into the interior to be used to display the information. No surface in the motor vehicle is wasted therefore, since in particular the second display subregion projecting into the interior is used for displaying information. This allows improved use of the installation space, in particular in the interior of the motor vehicle, to display the information.

The second display subregion may be in a form such that the information can be displayed in the second display subregion according to user requirements. By way of example, the user can independently and individually have the applicable information moved and accordingly displayed on the second display subregion. By way of example, the second display subregion can then be used as a pinboard for various content or media.

The integral embodiment of the first subregion and of the second display subregion allows in particular a visually reduced and clear display apparatus to be provided. It is furthermore possible for flexible use of the applicable control areas on the second display subregion to be provided, for example for inputting and positioning the applicable information. As a result, it is possible to achieve the effect that the more passive surfaces, according to the related art, can also be used as active surfaces. In particular, should for example the viewing window be used as augmented reality (AR), such improved presentation of information can be realized on the viewing window. In addition, a visual and/or a technical connection or linking of the user interface or of the display surface from the viewing window to the corresponding second display subregions can be realized. This allows fusion of input and display media to be realized.

In particular, there is provision for the first subregion and the second display subregion to be made from glass, in particular from safety glass.

In accordance with one advantageous embodiment, the first subregion can be in the form of a front window of the motor vehicle. In particular, the front window can also be referred to as a windshield. In particular, the information can then accordingly be in a form on the second display subregion of the front window. It is likewise possible for the front window to be in the form of a type of head up display unit and hence for an augmented reality to be able to be displayed within the front window. This has the advantage that for example a driver of the motor vehicle can grasp the information within the front window with little effort even during a driving mode of the motor vehicle, which allows less distraction of the driver to be realized. This results in increased road safety.

It has furthermore been found to be advantageous if the second display subregion is in the form of a dashboard of the motor vehicle. In particular, the dashboard is in roof-like form and serves as a cover in the motor vehicle for in particular components that are used for vehicle control of the motor vehicle. This roof region is merely in the form of a cover in the related art. In the motor vehicle, the dashboard in the form of a second display subregion is now used to display the information. In other words, the information is displayed on the dashboard. This results in the driver having to change his angle of vision only a little in order to be able to grasp the information. In addition, this uses an additional surface in the motor vehicle, which can be provided for further display of the information. It is therefore possible for a large number of pieces of information to be provided in the motor vehicle. In particular, this results in a reduction of information density being able to be performed, such as for example a reduction of information density on the central console of the motor vehicle, since the display surface is enlarged for the presentation of information.

In a further advantageous embodiment, the first subregion is in the form of a side window of the motor vehicle. In other words, the side window can also be used as first subregion. In particular, the second display subregion of the side window is then likewise designed so as to project into the interior, and the information can be displayed on the second display subregion of the window. It is therefore possible for a further display surface to be provided, so that the information density can be reduced, since the plurality of pieces of information can be distributed over a larger surface. In particular, it is possible for the driver of the motor vehicle, for example, to be able to freely decide which information can be displayed on the second display subregion of the side window. The display of information can therefore be provided in the motor vehicle individually.

It has furthermore been found to be advantageous if the second display subregion is in the form of a touch-sensitive screen for displaying the information and for operating the display apparatus. In other words, a touch of the second display subregion can be used to present the information and to perform appropriate operation, for example by an application. This results in complex control elements within the motor vehicle being dispensed with, since it is in particular already possible for the touch-sensitive screen to be able to be used to perform operation. In particular, there can be provision for appropriate electronics to then be able to be arranged beneath the second display subregion, which electronics permit the touch-sensitive display and operation. This allows the display apparatus to be operated at a highly functional level.

In a further advantageous embodiment, a substantially acute angle, in particular of between 30 degrees and 80 degrees, is formed between the first subregion and the second display subregion. In particular, the acute angle is embodied such that the acute angle is formed between the tangents of the first display subregion and the second subregion. In particular, the angle is dependent on the window inclination of the viewing window relative to the motor vehicle. By way of example, the viewing windows in sports motor vehicles are more tapered than in an all-terrain vehicle, for example. In particular, the acute angle allows for example a driver of the motor vehicle to be able to register surroundings of the motor vehicle, for example, through the viewing window freely and without impairment and nevertheless to be able to reliably grasp the information on the second display subregion.

It is likewise advantageous if a dimmable film for displaying the information displayed on the second display subregion is integrated in at least regions of the first subregion. In particular, this is made possible such that the information displayed on the second display subregion is reflected by the dimmable film, so that the reflected information is visible to the driver of the motor vehicle. This allows for example augmented reality to be achieved for the driver looking through the viewing window. In particular, a type of head up display apparatus (head up display) can be realized by the dimmable film, for example. This results in for example the driver of the motor vehicle not having to turn his eyes away from the viewing window in order to be able to grasp the information. This can allow reliable and safe operation of the motor vehicle.

In accordance with a further advantageous embodiment, the second display subregion is in the form of a window root or in the form of a window roof. In other words, in particular the second display subregion, which is designed to display the information, is in a lower subregion of the display apparatus when viewed in the vertical axis of the vehicle. This lower subregion is also referred to as the window root. It is likewise possible for the second display subregion to be on an upper subregion of the display apparatus when viewed in the vertical axis of the vehicle. In particular, this is an extension of the display apparatus in the direction of the window roof, as it were. It is thus possible for the information to be displayed at different locations in the motor vehicle in different ways. This allows previously passive surfaces, in other words surfaces that did not present a display, to be used for display. In particular, this results in a flood of information onto small subregions in the motor vehicle being prevented.

The display apparatus may have two second display subregions, with one second display subregion being in the form of a window root and the other second display subregion being in the form of a window roof. This additionally allows the information to be displayed at two different locations. This can likewise result in a reduction of information density.

In a further advantageous embodiment, the display apparatus can have an eyeline detection device for detecting an eyeline, or gaze direction, of an occupant of the motor vehicle and the display apparatus can be designed to display the information on the second display subregion on the basis of the detected eyeline. In other words, the eyeline of a driver can be detected and the information can then be displayed in the direction in which the driver is looking. This results in the driver of the motor vehicle having the information displayed without needing to substantially change his line of vision to grasp the information. In particular, should the driver turn his eyes to the surroundings of the motor vehicle, for example to the road traffic, then the information can additionally be displayed in his field of view as appropriate. This results in safe operation of the motor vehicle.

Further, there can be provision for the display apparatus to have an eyeline detection device for detecting an eyeline of an occupant of the motor vehicle and for the display apparatus to be designed to operate the display apparatus on the basis of the detected eyeline. In other words, should the driver look at one of several pieces of displayed information, for example, this can be regarded as a control signal by the eyeline detection. Looking at the displayed information can then result in operation of the applicable information, should this be linked to a function. This allows the operation of different functional units in the motor vehicle to be realized easily and nevertheless reliably. In particular, it allows the driver to be prevented from further distractions, such as for example moving his hands from the steering wheel for operation, since operation can be realized merely by the eyeline detection. This results in safe operation of the motor vehicle in particular in road traffic. The motor vehicle is in particular in the form of an automobile.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

In the exemplary embodiments, the described components of the embodiments are each individual features that should be considered independently of one another and that each also develop the information independently of one another and hence should also be regarded as part of the invention individually or in a combination other than that shown. In addition, the described embodiments are also complementable by other features that have already been described.

In the figures, identical reference signs each denote elements having the same function.

Figure 1:
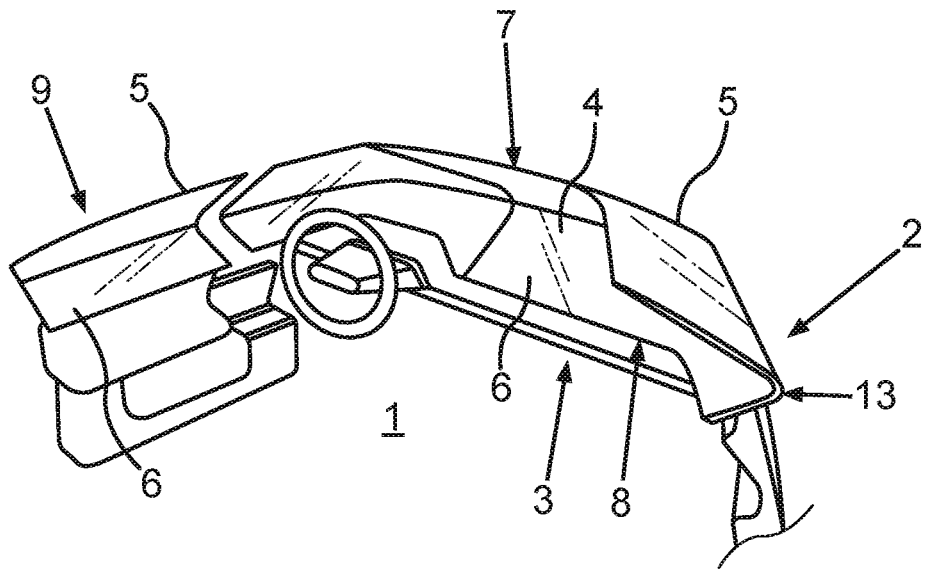
FIG. 1 is a schematic perspective view of an interior of an embodiment of a motor vehicle.

FIG. 1 shows a schematic perspective view of an embodiment of an interior 1 of an embodiment of a motor vehicle 2. The motor vehicle 2 has a display apparatus 3 for displaying at least one piece of information 4. The display apparatus 3 has a first subregion 5 and a second display subregion 6. The first subregion 5 is in the form of a viewing window 7, 9 of the motor vehicle 2 and at least part of the subregion bounds the interior 1 of the motor vehicle 2. The second display subregion 6 is designed to display the information 4.

FIG. 1 depicts two separate display apparatuses that each have a first subregion 5 and a second display subregion 6. In one example, the first subregion 5 is a side window, for example on the driver's side. In a second example, the first subregion 5 is a front window or a windshield. There can be provision for both versions to be realized in a motor vehicle 1. However, there can also be provision for just one of the two versions to be realized in a motor vehicle 1.

There is provision for the first subregion 5 and the second display subregion 6 to be in integral form with one another and hence to form a one-piece assembly, wherein the subregions 5, 6 lead into one another at an angle, and at least regions of the second display subregion 6 are designed so as to project into the interior 1 of the motor vehicle 2. A lead-in point 13 between the first subregion 5 and the second display subregion 6 can be slightly rounded when viewed in cross section, so that an outside of the lead-in point 13 or of the transition has a corner-free contour. An angle between the subregions 5, 6 is then measured in particular between tangents to the outsides of the subregions 5, 6.

In the exemplary embodiment that follows, it is shown in particular that the first subregion 5 is in the form of a front window 7, in particular in the form of a windshield, of the motor vehicle 2. In particular, there is then provision in this embodiment for the second display subregion 6 to be able to be in the form of a dashboard 8, for example.

Further, there can be provision for the first subregion 5 to be in the form of a side window 9 of the motor vehicle 2.

By way of example, there can be provision for the second display subregion 6 to be in the form of a touch-sensitive screen for displaying the information 4 and for operating the display apparatus 3. In other words, it is possible for the information 4 to be presented on the second display subregion 6 and for a function coupled to the information 4 to be accordingly operated by the touch of a driver of the motor vehicle 2, for example. In particular, this allows a surface to be additionally provided in the motor vehicle 2 that allows display of the information 4 and operation of the information 4. In addition, this results in a visual increase in value and in a high level of functionality inside the motor vehicle 2.

In particular, there can be provision for the driver of the motor vehicle 2 to have the information 4 displayed individually on the second display subregion 6. In other words, as a result of the driver of the motor vehicle 2 touching the information 4, for example, he can freely move the information 4 locally on the second display subregion 6. This allows a type of pinboard function to be achieved for various content and media.

Figure 2:
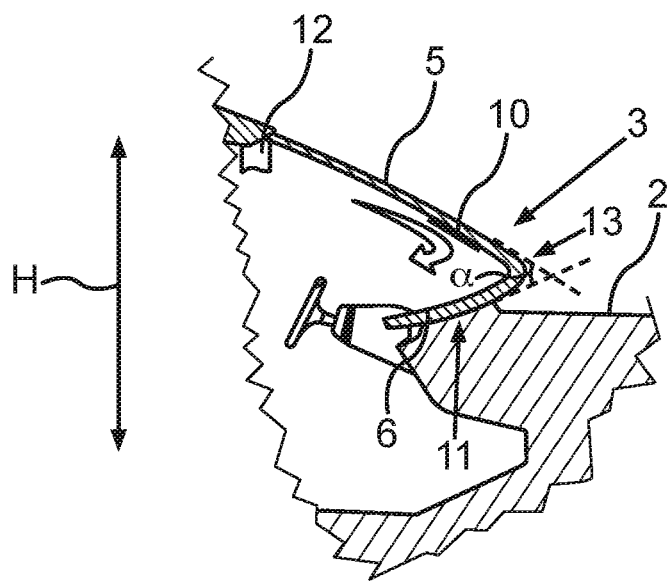
FIG. 2 is a schematic sectional view of an interior of an embodiment of the motor vehicle.

FIG. 2 shows a schematic sectional view of an embodiment of the motor vehicle 2 with an embodiment of the display apparatus 3. In particular, FIG. 2 shows the integral nature or one-piece nature of the subregion 5 with the second display subregion 6.

In particular, there is provision for a substantially acute angle α, in particular of between 30 degrees and 80 degrees, to be formed between the first subregion 5, in this instance the front window, and the second display subregion 6 when viewed in a cross section or longitudinal section, as shown in FIG. 2. This angle a is formed at a lead-in point 13 or at a transition between the first subregion 5 and the second display subregion 6. In particular, this angle a is dependent on the motor vehicle type. By way of example, a more acute angle a is formed in the case of sports motor vehicles, whereas a more obtuse angle a is formed in the case of all-terrain vehicles, for example.

Further, there can be provision for a dimmable film 10 for displaying the information 4 displayed on the second display subregion 6 to be integrated in at least regions of the first subregion 5. In other words, the information 4 displayed on the second display subregion 6 can be reflected or mirrored by the dimmable film 10, so that a driver of the motor vehicle 2 presents the information 4 on the first subregion 5. By way of example, this can result in what is known as augmented reality. This can be utilized for use in a head up display apparatus (head up display), for example.

Further, there can be provision for the second display subregion 6 to serve as a window root 11, in other words in particular as fastening for the viewing window 7, 9. In addition, there can be provision for an electronic computing device, for example for displaying the information 4 in the second display subregion 6, to be arranged in particular in the region of the window root 11. Further, it is particular for the second display subregion 6 to be in the form of a window roof. In other words, the second display subregion 6 can also be in the form of an extension of the viewing window 7, 9 in a vehicle vertical direction H of the motor vehicle 2 when viewed at the roof lining. In particular, this allows even the previously passive surface of the roof to be used for displaying the information 4.

The display apparatus 3 may have two second display subregions 6, one second display subregion 6 being in the form of a window root 11 and the second display subregion 6 being in the form of a window roof. This additionally allows the information 4 to be displayed at two different locations. This can likewise result in reduction of the information density.

Further, there can be provision for the display apparatus 3 to have an eyeline detection device 12 designed to detect an eyeline of an occupant of the motor vehicle 2 and for the display apparatus 3 to be designed to display the information 4 on the second display subregion 6 on the basis of the detected eyeline. Further, there can be provision for the display apparatus 3 to be designed to operate the display apparatus 3 on the basis of the detected eyeline. In other words, it is both possible for the eyeline to be taken as a basis for displaying the information 4 as appropriate in the line of vision of the occupant and at the same time also possible for the detected eyeline to also be taken as a basis for performing operation of a function that is in particular linked to the information 4. This results in improved operation of the display apparatus 3 and in particular in less distraction for the driver of the motor vehicle 2 during a driving mode, for example, so that road safety can be increased by the display apparatus 3 overall.

The first subregion 5 can also be in the form of a display subregion for visually displaying information.

By and large, the examples show how an infinite screen dashboard can be provided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A motor vehicle having an interior, comprising: a window forming part of a boundary of the interior; and a display configured to display information in first and second subregions, only the first subregion formed in the window of the motor vehicle, the first subregion and the second subregion being capable of displaying pieces of the information independently to an occupant of the motor vehicle and having an integral form with the first subregion at an angle to the second subregion of less than 180°, at least portions of the second subregion projecting into the interior of the motor vehicle.

2. The motor vehicle according to claim 1, wherein the window in which the first subregion is formed is a front window of the motor vehicle.

3. The motor vehicle according to claim 2, wherein the second subregion of the display is at least part of a dashboard of the motor vehicle.

4. The motor vehicle according to claim 3, wherein the second subregion of the display includes a touch-sensitive screen displaying at least one piece of the information and receiving input by the display.

5. The motor vehicle according to claim 4, wherein an angle between 30° and 80° is formed by the first subregion and the second subregion.

6. The motor vehicle according to claim 5, wherein a dimmable film configured to display at least selected pieces of the information displayed on the second subregion is integrated in at least regions of the first subregion.

7. The motor vehicle according to claim 2,
further comprising one of a window root and a window roof, and
wherein the second subregion of the display is formed in the one of the window root and the window roof.

8. The motor vehicle according to claim 7, wherein the second subregion includes a touch-sensitive screen displaying at least one piece of the information and receiving input by the display.

9. The motor vehicle according to claim 8, wherein a dimmable film configured to display at least some of the information displayed on the second subregion is integrated in at least regions of the first subregion.

10. The motor vehicle according to claim 9, wherein the display further includes:
a gaze direction detector configured to detect a gaze direction of an occupant of the motor vehicle and
a display controller configured to display the at least one piece of the information on the second subregion based on the gaze direction.

11. The motor vehicle according to claim 9, wherein the display further includes:
a gaze direction detector configured to detect a gaze direction of an occupant of the motor vehicle and
a display controller configured to operate the display apparatus based on the gaze direction.

12. The motor vehicle according to claim 1, wherein the window in which the first subregion is formed is a side window of the motor vehicle.

13. The motor vehicle according to claim 12, wherein the second subregion includes a touch-sensitive screen displaying at least one piece of the information and receiving input by the display.

14. The motor vehicle according to claim 13, wherein a dimmable film configured to display at least some of the information displayed on the second subregion is integrated in at least regions of the first subregion.

15. The motor vehicle according to claim 14, wherein the display further includes:
a gaze direction detector configured to detect a gaze direction of an occupant of the motor vehicle and
a display controller configured to display at least one piece of the information on the second subregion based on the gaze direction.

16. The motor vehicle according to claim 14, wherein the display further includes:
a gaze direction detector configured to detect a gaze direction of an occupant of the motor vehicle and
a display controller configured to operate the display apparatus based on the gaze direction.

17. The motor vehicle according to claim 1, wherein the second subregion of the display is at least part of a dashboard of the motor vehicle.

18. The motor vehicle according to claim 1, wherein the second subregion includes a touch-sensitive screen displaying at least one piece of the information and receiving input by the display.

19. The motor vehicle according to claim 1, wherein a dimmable film configured to display at least one piece of the information displayed on the second subregion is integrated in at least regions of the first subregion.

20. The motor vehicle according to claim 1,
further comprising one of a window root and a window roof, and
wherein the second subregion of the display is formed in the one of the window root and the window roof.

* * * * *

UNITED STATES PATENT AND TRADEMARK OFFICE
CERTIFICATE OF CORRECTION

PATENT NO. : 11,167,640 B2  
APPLICATION NO. : 16/650055  
DATED : November 9, 2021  
INVENTOR(S) : Mertens et al.

Page 1 of 1

It is certified that error appears in the above-identified patent and that said Letters Patent is hereby corrected as shown below:

On the Title Page

Item (30), Delete "102018207932.5" and insert --102018207932.3--, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*